United States Patent
Song et al.

(10) Patent No.: US 11,436,595 B2
(45) Date of Patent: Sep. 6, 2022

(54) METHOD FOR ISSUING, USING, REFUNDING, SETTLING AND REVOKING ELECTRONIC VOUCHER USING UPDATED STATUS OF BALANCE DATABASE BY RESPECTIVE BLOCKS IN BLOCKCHAIN, AND SERVER USING THE SAME

(71) Applicant: Coinplug, Inc., Gyeonggi-do (KR)

(72) Inventors: Joo Han Song, Gyeonggi-do (KR); Jay Wu Hong, Seoul (KR); Joon Sun Uhr, Gyeonggi-do (KR)

(73) Assignee: Coinplug, Inc., Gyeonggi-do (KR)

( * ) Notice: Subject to any disclaimer, the term of this patent is extended or adjusted under 35 U.S.C. 154(b) by 978 days.

(21) Appl. No.: 15/729,967

(22) Filed: Oct. 11, 2017

(65) Prior Publication Data

US 2018/0101844 A1    Apr. 12, 2018

(30) Foreign Application Priority Data

Oct. 11, 2016    (KR) ...................... 10-2016- 0131086

(51) Int. Cl.
*G06Q 20/38* (2012.01)
*G06F 16/22* (2019.01)
(Continued)

(52) U.S. Cl.
CPC ..... *G06Q 20/3821* (2013.01); *G06F 16/2246* (2019.01); *G06Q 20/02* (2013.01);
(Continued)

(58) Field of Classification Search
CPC .. G06Q 20/3821; G06Q 20/02; G06Q 20/047; G06Q 20/3825; G06Q 20/3829;
(Continued)

(56) References Cited

U.S. PATENT DOCUMENTS 8,977,857 B1 *   3/2015   Triscon .................. H04L 9/3213
                                               713/172
2008/0257958 A1 * 10/2008   Rothwell ........... G06Q 30/0233
                                               235/380
(Continued)

FOREIGN PATENT DOCUMENTS

KR    10-1575030 B1    12/2015
KR    10-1637854 B1     7/2016

OTHER PUBLICATIONS

Satoshi Nakamoto, A Peer-to-Peer Electronic Cash System, www.bitcoin.org (Year: 2008).*

(Continued)

*Primary Examiner* — John W Hayes
*Assistant Examiner* — Yingying Zhou
(74) *Attorney, Agent, or Firm* — Husch Blackwell LLP

(57) ABSTRACT

A method of issuing an electronic voucher by an issuer is provided. The method includes steps of: (a) creating and registering a transaction including a voucher data, a public key and a signature value of the issuer, with a private blockchain database, providing the issuer with a PrivTxid locating the transaction in the private blockchain database, and updating and registering value information including a balance of the voucher data with a BDB; and (b) acquiring and registering a representative hash value calculated using a specific hash value, which is a hash value of the voucher data, the public key, and the signature value, and its corresponding hash values which include a hash value of a delta_n including all balances of all vouchers, identifiable by all PrivTxids locating their transactions, with a public blockchain database, and acquiring a Txid locating the representative hash value in the public blockchain database.

8 Claims, 9 Drawing Sheets

(51) Int. Cl.
*G06Q 20/02* (2012.01)
*H04L 9/32* (2006.01)
*G06Q 20/04* (2012.01)
*H04L 9/06* (2006.01)
*H04L 9/08* (2006.01)
*H04L 9/30* (2006.01)
*H04L 9/00* (2022.01)

(52) U.S. Cl.
CPC ....... *G06Q 20/047* (2020.05); *G06Q 20/3825* (2013.01); *G06Q 20/3829* (2013.01); *H04L 9/0643* (2013.01); *H04L 9/0825* (2013.01); *H04L 9/30* (2013.01); *H04L 9/3236* (2013.01); *H04L 9/3239* (2013.01); *H04L 9/3247* (2013.01); *H04L 9/3265* (2013.01); *G06Q 2220/00* (2013.01); *H04L 9/50* (2022.05)

(58) Field of Classification Search
CPC ............. G06Q 2220/00; G06Q 20/385; G06Q 20/387; G06Q 30/0207; G06Q 30/04; G06F 16/2246; H04L 9/0643; H04L 9/0825; H04L 9/30; H04L 9/3236; H04L 9/3239; H04L 9/3247; H04L 9/3265; H04L 2209/38
See application file for complete search history.

(56) References Cited

U.S. PATENT DOCUMENTS

| 2015/0006899 | A1* | 1/2015 | Seo ........................ H04L 9/3247 713/176 |
| 2015/0324764 | A1* | 11/2015 | Van Rooyen .......... G06Q 20/02 705/69 |
| 2015/0371228 | A1* | 12/2015 | Kershaw ............ G06Q 20/3274 705/77 |
| 2017/0331896 | A1* | 11/2017 | Holloway ................. H04L 9/12 |
| 2018/0068130 | A1* | 3/2018 | Chan ....................... G06F 21/64 |

OTHER PUBLICATIONS

Kangmo, Detecting Forgery of Private Blockchain data using Public Blockchain, Dec. 27, 2016, https://github.com/Kangmo/blitz/wiki.
Shin, Why the Bitcoin Blockchain Could Make Gift Cards, A Consumer Favorite, Even More Beloved, Forbes, Jun. 17, 2015, www.forbes.com.
Wuille, Tree Signatures, Aug. 24, 2015, https://blockstream.com/2015/08/24/treesignatures.html.
Olavsrud, How Blockchain will disrupt your business, Sep. 5, 2017, CIO.

* cited by examiner

(12) United States Patent
US 11,436,595 B2

METHOD FOR ISSUING, USING, REFUNDING, SETTLING AND REVOKING ELECTRONIC VOUCHER USING UPDATED STATUS OF BALANCE DATABASE BY RESPECTIVE BLOCKS IN BLOCKCHAIN, AND SERVER USING THE SAME

CROSS REFERENCE TO RELATED APPLICATION

This application claims priority to and incorporates herein by reference all disclosure in Korean patent application no. 10-2016-0131086 filed Oct. 11, 2016

FIELD OF THE INVENTION

The present invention relates to a method for issuing, using, refunding, settling and revocating electronic voucher using updated status of balance database (BDB) by respective blocks in blockchain; and more particularly, to the method of (a) performing (a-1) a process of creating a specific issuing transaction, for the specific electronic voucher, including (i) a specific electronic voucher data having at least one of a specific unique nonce and specific value information of the specific electronic voucher, (ii) a public key of the specific issuer, and (iii) a signature value of the specific issuer, which is acquired by signing a hash value or its processed value of the specific electronic voucher data, with a private key of the specific issuer, and then registering the specific issuing transaction with a private blockchain database, (a-2) a process of providing the specific issuer with a first PrivTxid which represents first location information on where the specific issuing transaction is recorded in the private blockchain database, and (a-3) a process of updating and registering the specific value information including a specific balance of the specific electronic voucher data with a balance database, and (b) performing, if one or more anchoring conditions are satisfied, (b-1) a process of acquiring a first representative hash value calculated by using a specific hash value and its corresponding one or more neighboring hash values, wherein the specific hash value is a hash value of (i) the specific electronic voucher data, (ii) the public key of the specific issuer, and (iii) the signature value of the specific issuer, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific issuing transaction, (b-2) a process of registering the first representative hash value or its processed value with a public blockchain database, and (b-3) a process of acquiring a first Txid which represents second location information on where the first representative hash value or its processed value is recorded in the public blockchain database, and the server using the same.

BACKGROUND OF THE INVENTION

A voucher, including a coupon or a gift certificate, is a certificate or financial instrument where a number or monetary amount for goods or services is written. It is issued for the purpose of publicity and promotion of products or services, and generally refers to a discount ticket that can be redeemed for a financial discount or rebate when a person who previously bought certain products purchases a product again at the same store, or a coupon that can be exchanged with a prize when a person buys a product worth more than a certain amount.

Recently, various vouchers for plays, movies and books in addition to vouchers for purchases at a restaurant or at a department store have seen common use, and electronic coupons are also common as the Internet becomes popular.

However, electronic vouchers such as mobile coupons, gift coupons, or discount coupons mostly adopt a barcode or a registration number which are transferred as images or text, and as a result, data of these types may be vulnerable to forgery and illegal copying. Also, there is a problem of multiple issuance of a same coupon caused by a system malfunction, rendering the coupon invalid.

SUMMARY OF THE INVENTION

It is an object of the present invention to solve all the aforementioned problems.

It is another object of the present invention to provide a method of registering an electronic voucher with a blockchain of a virtual currency to prevent forgery and illegal copying, and a server using the same.

It is still another object of the present invention to provide a method of securing information on activities including usage of the electronic voucher, and preventing forgery and illegal copying thereof, by using hash functions and a cryptography, and the server using the same.

It is still yet another object of the present invention to provide a method of preventing multiple issuance of a same electronic voucher, by registering the electronic voucher with the blockchain of the virtual currency, and the server using the same.

In accordance with one aspect of the present invention, there is provided a method of issuing at least one specific electronic voucher by at least one specific issuer, including steps of: (a) a server performing or supporting another device to perform (a-1) a process of creating a specific issuing transaction, for the specific electronic voucher, including (i) a specific electronic voucher data having at least one of a specific unique nonce and specific value information of the specific electronic voucher, (ii) a public key of the specific issuer, and (iii) a signature value of the specific issuer, which is acquired by signing a hash value or its processed value of the specific electronic voucher data, with a private key of the specific issuer, and then registering the specific issuing transaction with a private blockchain database, (a-2) a process of providing the specific issuer with a first PrivTxid which represents first location information on where the specific issuing transaction is recorded in the private blockchain database, and (a-3) a process of updating and registering the specific value information including a specific balance of the specific electronic voucher data with a balance database; and (b) the server, if one or more anchoring conditions are satisfied, performing or supporting another device to perform (b-1) a process of acquiring a first representative hash value calculated by using a specific hash value and its corresponding one or more neighboring hash values, wherein the specific hash value is a hash value of (i) the specific electronic voucher data, (ii) the public key of the specific issuer, and (iii) the signature value of the specific issuer, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific issuing transaction, (b-2) a process of registering the first representative hash value or its processed value with a public blockchain database, and (b-3) a process of acquiring a first Txid which represents second location information on where the first representative hash value or its processed value is recorded in the public blockchain database.

In accordance with another aspect of the present invention, there is provided a method of using at least one specific electronic voucher by at least one specific user, including steps of: (a) a server performing or supporting another device to perform (a-1) a process of creating a specific using transaction, for the specific electronic voucher, including (i) a specific electronic voucher data having at least one of a specific unique nonce and specific value information of the specific electronic voucher, (ii) a public key of the specific user, and (iii) a signature value of the specific user, which is acquired by signing a hash value or its processed value of the specific electronic voucher data, with a private key of the specific user, and then registering the specific using transaction with a private blockchain database, (a-2) a process of providing the specific user with a first PrivTxid which represents first location information on where the specific using transaction is recorded in the private blockchain database, and (a-3) a process of updating and registering the specific value information including a specific balance of the specific electronic voucher data with a balance database; and (b) the server, if one or more anchoring conditions are satisfied, performing or supporting another device to perform (b-1) a process of acquiring a first representative hash value calculated by using a specific hash value and its corresponding one or more neighboring hash values, wherein the specific hash value is a hash value of (i) the specific electronic voucher data, (ii) the public key of the specific user, and (iii) the signature value of the specific user, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific using transaction, (b-2) a process of registering the first representative hash value or its processed value with a public blockchain database, and (b-3) a process of acquiring a first Txid which represents second location information on where the first representative hash value or its processed value is recorded in the public blockchain database.

In accordance with still another aspect of the present invention, there is provided a method of refunding at least one specific electronic voucher by at least one specific user, including steps of: (a) a server performing or supporting another device to perform (a-1) a process of creating a specific refunding transaction, for the specific electronic voucher, including (i) a specific electronic voucher data having at least one of a specific unique nonce and specific refund value information of the specific electronic voucher, (ii) a public key of the specific user, and (iii) a signature value of the specific user, which is acquired by signing a hash value or its processed value of the specific electronic voucher data, with a private key of the specific user, and then registering the specific refunding transaction with a private blockchain database, (a-2) a process of providing the specific user with a first PrivTxid which represents first location information on where the specific refunding transaction is recorded in the private blockchain database, and (a-3) a process of updating and registering the specific refund value information including a specific balance of the specific electronic voucher data with a balance database; and (b) the server, if one or more anchoring conditions are satisfied, performing or supporting another device to perform (b-1) a process of acquiring a first representative hash value calculated by using a specific hash value and its corresponding one or more neighboring hash values, wherein the specific hash value is a hash value of (i) the specific electronic voucher data, (ii) the public key of the specific user, and (iii) the signature value of the specific user, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific refunding transaction, (b-2) a process of registering the first representative hash value or its processed value with a public blockchain database, and (b-3) a process of acquiring a first Txid which represents second location information on where the first representative hash value or its processed value is recorded in the public blockchain database.

In accordance with still yet another aspect of the present invention, there is provided a method of settling at least one specific electronic voucher by at least one specific seller, including steps of: (a) a server performing or supporting another device to perform (a-1) a process of creating a specific settling transaction, for the specific electronic voucher, including (i) a specific electronic voucher data having at least one of a specific unique nonce and specific settling value information of the specific electronic voucher, (ii) a public key of the specific seller, and (iii) a signature value of the specific seller, which is acquired by signing a hash value or its processed value of the specific electronic voucher data, with a private key of the specific seller, and then registering the specific settling transaction with a private blockchain database, (a-2) a process of providing the specific seller with a first PrivTxid which represents first location information on where the specific settling transaction is recorded in the private blockchain database, and (a-3) a process of updating and registering the specific settling value information including a specific balance of the specific electronic voucher data with a balance database; and (b) the server, if one or more anchoring conditions are satisfied, performing or supporting another device to perform (b-1) a process of acquiring a first representative hash value calculated by using a specific hash value and its corresponding one or more neighboring hash values, wherein the specific hash value is a hash value of (i) the specific electronic voucher data, (ii) the public key of the specific seller, and (iii) the signature value of the specific seller, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific settling transaction (b-2) a process of registering the first representative hash value or its processed value with a public blockchain database, and (b-3) a process of acquiring a first Txid which represents second location information on where the first representative hash value or its processed value is recorded in the public blockchain database.

In accordance with still yet another aspect of the present invention, there is provided a method of revoking at least one specific electronic voucher by at least one specific issuer, including steps of: (a) a server performing or supporting another device to perform (a-1) a process of creating a specific revocating transaction, for the specific electronic voucher, including (i) a specific electronic voucher data having at least one of a specific unique nonce and specific revocation value information of the specific electronic voucher, (ii) a public key of the specific issuer, and (iii) a signature value of the specific issuer, which is acquired by signing a hash value or its processed value of the specific electronic voucher data, with a private key of the specific issuer, and then registering the specific revocating transaction with a private blockchain database, (a-2) a process of providing the specific issuer with a first PrivTxid which represents first location information on where the specific revocating transaction is recorded in the private blockchain database, and (a-3) a process of updating and registering the specific revocation value information including a specific balance of the specific electronic voucher data with a balance database; and (b) the server, if one or more anchoring conditions are satisfied, performing or supporting another device to perform (b-1) a process of acquiring a first representative hash value calculated by using a specific hash value and its corresponding one or more neighboring hash values, wherein the specific hash value is a hash value of (i) the specific electronic voucher data, (ii) the public key of the specific issuer, and (iii) the signature value of the specific issuer, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific revocating transaction, (b-2) a process of registering the first representative hash value or its processed value with a public blockchain database, and (b-3) a process of acquiring a first Txid which represents second location information on where the first representative hash value or its processed value is recorded in the public blockchain database.

In accordance with still yet another aspect of the present invention, there is provided a server for issuing at least one specific electronic voucher by at least one specific issuer, including: a communication part for acquiring or supporting another device to acquire a specific electronic voucher data having at least one of a specific unique nonce and specific value information of the specific electronic voucher, a public key of the specific issuer, and a signature value of the specific issuer, which is acquired by signing a hash value or its processed value of the specific electronic voucher data, with a private key of the specific issuer; and a processor for (i) registering or supporting another device to register the specific issuing transaction with a private blockchain database, providing or supporting another device to provide the specific issuer with a first PrivTxid which represents first location information on where the specific issuing transaction is recorded in the private blockchain database, and updating and registering or supporting another device to update and register the specific value information including a specific balance of the specific electronic voucher data with a balance database; and (ii) performing or supporting another device to perform, if one or more anchoring conditions are satisfied, (ii-1) acquiring a first representative hash value calculated by using a specific hash value and its corresponding one or more neighboring hash values, wherein the specific hash value is a hash value calculated by using the specific electronic voucher data, the public key of the specific issuer, and the signature value of the specific issuer, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific issuing transaction, (ii-2) registering the first representative hash value or its processed value with a public blockchain database, and (ii-3) acquiring a first Txid which represents second location information on where the first representative hash value or its processed value is recorded in the public blockchain database.

In accordance with still yet another aspect of the present invention, there is provided a server for using at least one specific electronic voucher by at least one specific user, including: a communication part for acquiring or supporting another device to acquire a specific electronic voucher data having at least one of a specific unique nonce and specific value information of the specific electronic voucher, a public key of the specific user, and a signature value of the specific user, which is acquired by signing a hash value or its processed value of the specific electronic voucher data, with a private key of the specific user; and a processor for (i) registering or supporting another device to register the specific using transaction with a private blockchain database, providing or supporting another device to provide the specific user with a first PrivTxid which represents first location information on where the specific using transaction is recorded in the private blockchain database, and updating and registering or supporting another device to update and register the specific value information including a specific balance of the specific electronic voucher data with a balance database, and (ii) performing or supporting another device to perform, if one or more anchoring conditions are satisfied, (ii-1) acquiring a first representative hash value calculated by using a specific hash value and its corresponding one or more neighboring hash values, wherein the specific hash value is a hash value of the specific electronic voucher data, the public key of the specific user, and the signature value of the specific user, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific using transaction, (ii-2) registering the first representative hash value or its processed value with a public blockchain database, and (ii-3) acquiring a first Txid which represents second location information on where the first representative hash value or its processed value is recorded in the public blockchain database.

In accordance with still yet another aspect of the present invention, there is provided a server for refunding at least one specific electronic voucher by at least one specific user, including: a communication part for acquiring or supporting another device to acquire a specific electronic voucher data having at least one of a specific unique nonce and specific refund value information of the specific electronic voucher, a public key of the specific user, and a signature value of the specific user, which is acquired by signing a hash value or its processed value of the specific electronic voucher data, with a private key of the specific user; and a processor for (i) registering or supporting another device to register the specific refunding transaction with a private blockchain database, providing or supporting another device to provide the specific user with a first PrivTxid which represents first location information on where the specific refunding transaction is recorded in the private blockchain database, and updating and registering or supporting another device to update and register the specific refund value information including a specific balance of the specific electronic voucher data with a balance database, and (ii) if one or more anchoring conditions are satisfied, performing or supporting another device to perform (ii-1) acquiring a first representative hash value calculated by using a specific hash value and its corresponding one or more neighboring hash values, wherein the specific hash value is a hash value of the specific electronic voucher data, the public key of the specific user, and the signature value of the specific user, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific refunding transaction, (ii-2) registering the first representative hash value or its processed value with a public blockchain database, and (ii-3) acquiring a first Txid which represents second location information on where the first representative hash value or its processed value is recorded in the public blockchain database.

In accordance with still yet another aspect of the present invention, there is provided a server for settling at least one specific electronic voucher by at least one specific seller, including: a communication part for acquiring or supporting another device to acquire a specific electronic voucher data having at least one of a specific unique nonce and specific settling value information of the specific electronic voucher, a public key of the specific seller, and a signature value of the specific seller, which is acquired by signing a hash value or its processed value of the specific electronic voucher data with a private key of the specific seller; and a processor for (i) or supporting another device to register registering the specific settling transaction with a private blockchain database, providing or supporting another device to provide the specific seller with a first PrivTxid which represents first location information on where the specific settling transaction is recorded in the private blockchain database, and updating and registering or supporting another device to update and register the specific settling value information including a specific balance of the specific electronic voucher data with a balance database; and (ii) if one or more anchoring conditions are satisfied, performing or supporting another device to perform (ii-1) acquiring a first representative hash value calculated by using a specific hash value and its corresponding one or more neighboring hash values, wherein the specific hash value is a hash value of the specific electronic voucher data, the public key of the specific seller, and the signature value of the specific seller, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific settling transaction (ii-2) registering the first representative hash value or its processed value with a public blockchain database, and (ii-3) acquiring a first Txid which represents second location information on where the first representative hash value or its processed value is recorded in the public blockchain database.

In accordance with still yet another aspect of the present invention, there is provided a server for revoking at least one specific electronic voucher by at least one specific issuer, including: a communication part for acquiring or supporting another device to acquire a specific electronic voucher data having at least one of a specific unique nonce and specific revocation value information of the specific electronic voucher, a public key of the specific issuer, and a signature value of the specific issuer, which is acquired by signing a hash value or its processed value of the specific electronic voucher data, with a private key of the specific issuer; and a processor for (i) registering or supporting another device to register the specific revocating transaction with a private blockchain database, providing or supporting another device to provide the specific issuer with a first PrivTxid which represents first location information on where the specific revocating transaction is recorded in the private blockchain database, and updating and registering or supporting another device to update and register the specific revocation value information including a specific balance of the specific electronic voucher data with a balance database, and (ii) if one or more anchoring conditions are satisfied, performing or supporting another device to perform (ii-1) acquiring a first representative hash value calculated by using a specific hash value and its corresponding one or more neighboring hash values, wherein the specific hash value is a hash value of the specific electronic voucher data, the public key of the specific issuer, and the signature value of the specific issuer, and wherein a specific neighboring hash value among the neighboring hash values includes a hash value of a delta_n which includes all respective balances of all value information of all electronic vouchers, identifiable by all PrivTxids which represent all respective location information on where their corresponding all transactions are recorded in an n-th block of a blockchain in the private blockchain database, the n-th block including the specific revocating transaction, (ii-2) registering the first representative hash value or its processed value with a public blockchain database, and (ii-3) acquiring a first Txid which represents second location information on where the first representative hash value or its processed value is recorded in the public blockchain database.

Further, in accordance with one example embodiment of the present invention, a server for performing methods mentioned above is provided.

In addition, recordable media that are readable by a computer for storing a computer program to execute the method of the present invention is further provided.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
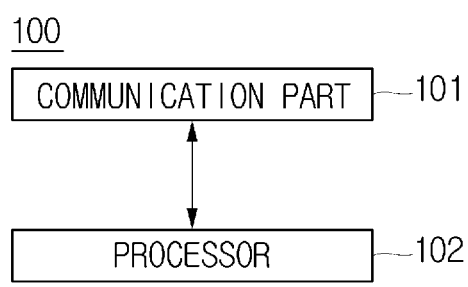
FIG. 1 is a diagram schematically illustrating a server issuing an electronic voucher in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

FIG. 1 is a diagram schematically illustrating a server 100 issuing an electronic voucher, and the server 100 may include a communication part 101 and a processor 102, in accordance with one example embodiment of the present invention. Identical reference numerals are for convenience of explanation but not intended for representing sameness of separate devices. Further, according to another example embodiment of the present invention, the method may be performed by the server 100 or another server of a different configuration.

The server 100 typically achieves desired system performance by using combinations of a computing device, e.g., a computer processor, a memory, a storage, an input device, an output device, and other devices that may include components of conventional computing devices; an electronic communication device such as a router or a switch; an electronic information storage system such as a network-attached storage (NAS) device and a storage area network (SAN), and computer software, i.e., instructions that allow the computing device to function in a specific way.

The communication part 101 of such devices may transmit requests and receive responses with other linked devices. As one example, such requests and responses may be carried out by the same TCP session, but they are not limited to these. For example, they could be transmitted and received as UDP datagrams.

The processor 102 of such devices may include hardware configuration of MPU (Micro Processing Unit) or CPU (Central Processing Unit), cache memory, data bus, etc. Additionally, OS and software configuration of applications that achieve specific purposes may be further included.

Further, the electronic voucher in accordance with the present invention, such as coupons, gift certificates, prize tickets, may include tangible/intangible value information similar to at least one of monetary amount, usage count, redeemable prize, and may also include any type of electronic files having the value information.

Figure 2:
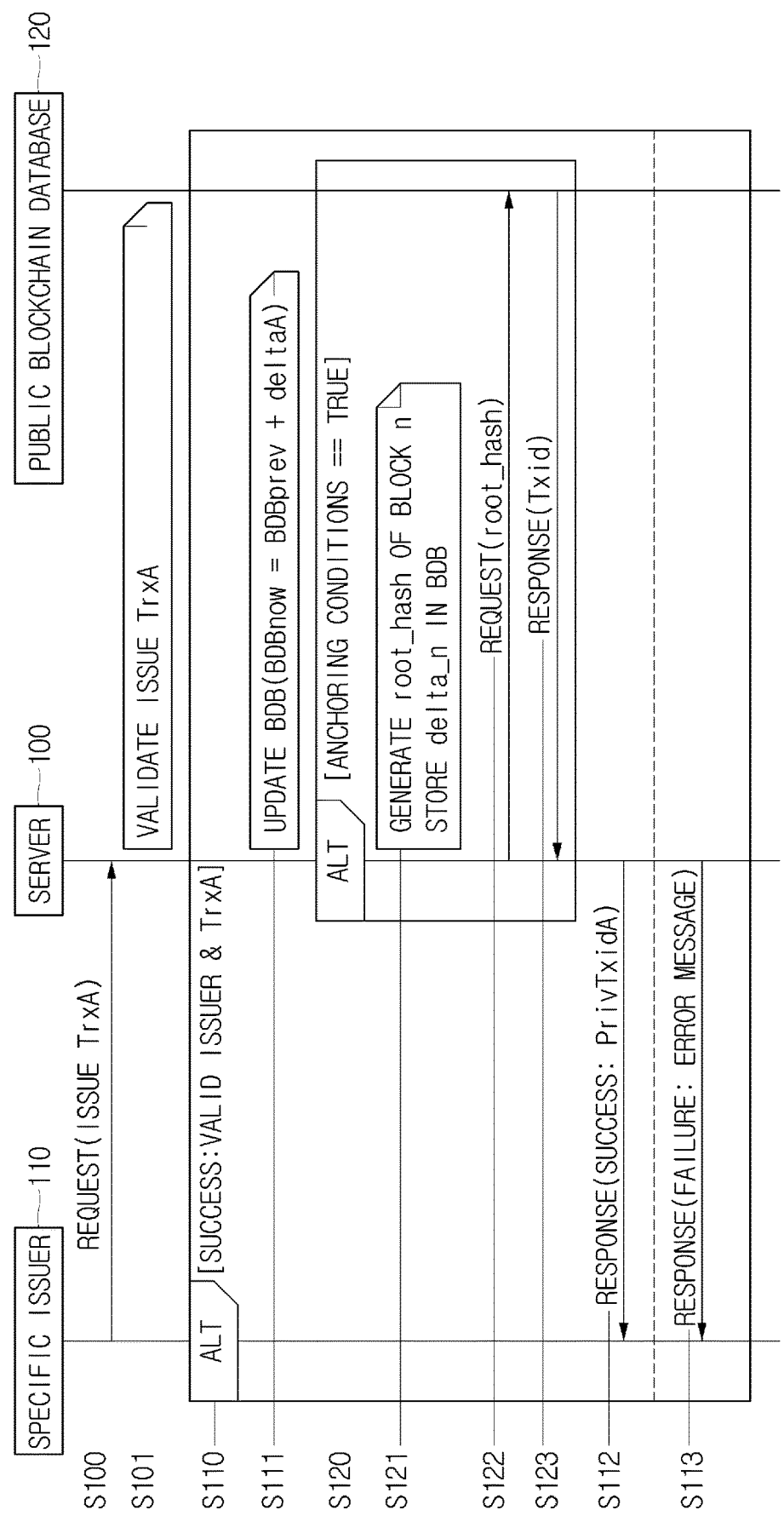
FIG. 2 is a diagram schematically illustrating a method of issuing the electronic voucher in accordance with one example embodiment of the present invention.

First, by referring to the server in FIG. 1, a method of issuing the electronic voucher by referring to FIG. 2 in accordance with one example embodiment of the present invention is described as follows.

The server 100 may receive a request (request(issue TrxA)) for issuing the electronic voucher, from a specific issuer through the communication part 101, including (i) electronic voucher data having at least one of a unique nonce and value information, (ii) a public key of the specific issuer, and (iii) a signature value of the specific issuer or its processed value, which is acquired by signing a hash value of the electronic voucher data, with a private key of the specific issuer, at the step of S100.

Herein, the electronic voucher data may further include at least one of (i) information on a type of the electronic voucher, (ii) the public key of the specific issuer who is a sender of the electronic voucher, (iii) a public key of a specific user who is a buyer, i.e., a receiver, of the electronic voucher, (iv) unique ID information of the specific issuer, and (v) information on an expiration date of the electronic voucher. Further, the public key of the specific user who bought the electronic voucher may be used for identification of the specific user. Clearly, the electronic voucher may be used as money or an anonymous gift certificate without the identification of its user. The value information of the electronic voucher may include information on tangible/intangible value as in a monetary amount, usage count, prize information, etc. Further, a unique ID of the specific issuer may be information for identification of the specific issuer, for example, a hash value of the public key of the specific issuer or its processed value. Information on the specific issuer or the specific user may be registered with the server 100 in advance or at an appropriate time as the need may be, and may include at least one public key of an issuer or a user who has private and public keys, which is registered with the server 100. Its details will be explained in other activities. Further, the expiration date of the electronic voucher may include a date after which the electronic voucher can no longer be used. Further, the unique nonce may be used to prevent, by providing the unique nonce for each transaction, a replay attack where an ill-willed seller transmits a valid transaction generated by the specific issuer or the specific user over a network multiple times, and the electronic voucher of the specific issuer or the specific user is redeemed multiple times if his/her account has an enough balance.

As one example, a transaction(TrxA) for issuing the electronic voucher may include 1. a type (issuing), 2. a unique nonce, 3. the public key of the specific issuer who is a sender, 4. the public key of the specific user who is a receiver, 5. issuance value information of the electronic voucher, 6. the unique ID of the specific issuer of the electronic voucher, 7. the expiration date of the electronic voucher, 8. the public key (MPubA) of the specific issuer for identification of an actor of the current status, and 9. a signature value (SigMPrivA(1:2:3:4:5:6:7:8)) of 1, 2, 3, 4, 5, 6, 7, and 8 signed with the private key of the specific issuer.

Then, at the step of S101, the server 100 may validate (i) the electronic voucher data, (ii) the public key of the specific issuer, and (iii) the signature value of the specific issuer, acquired through the communication part 101. Further, the server 100 may validate the format of the electronic voucher data.

Herein, the server 100 may validate the electronic voucher data by comparing a hash value acquired by applying a hashing function to the electronic voucher data, with a value acquired by using the public key of the specific issuer on the signature value of the specific issuer.

As one example, the signature value of the specific issuer may be validated by using the public key registered by the specific issuer.

In other words, the server 100 may perform processes of (i) acquiring a hash value by applying the hashing function to the electronic voucher data obtained by referring to the public key of the specific issuer, (ii) comparing it with a value acquired by using the registered public key of the specific issuer on the signature value, which represents a hash value of the electronic voucher data, of the specific issuer, and (iii) determining whether the electronic voucher data is signed by the specific issuer.

Then, if the electronic voucher data is determined as valid at the step of S110, the server 100 may perform a process of updating and registering the value information including a balance of the electronic voucher data with a balance database (BDB), at the step of S111. In other words, previous value information (BDBprev) of the electronic voucher registered with the BDB is updated to BDBnow=BDBprev+deltaA, where BDBnow is current value information and a deltaA is a variation caused by the specific issuing transaction for the electronic voucher. Herein, because the previous value information at the time of issuing the electronic voucher is zero or non-existent, the updated balance of the BDB may be the issuance value information of the electronic voucher. Herein, the deltaA is described as a variation of a single voucher issued by a single issuer for convenience, however, may include variations of multiple vouchers.

The server 100, if the electronic voucher data is determined as valid at the step of S110, may register the issuing transaction, i.e., transaction(TrxA), for the electronic voucher including (i) the electronic voucher data, (ii) the public key of the specific issuer, and (iii) the signature value of the specific issuer, with the private blockchain database, and may notify the specific issuer of a successful registration of a PrivTxid which represents location information on where the issuing transaction is recorded in the private blockchain database, at the step of S112. However, the server 100, if the electronic voucher data is determined as invalid at the step of S110, may notify the specific issuer 110 of a failed registration with an error message indicating the failed registration, at the step of S113.

Further, the server 100, if the electronic voucher data is determined as valid, if at least one or more anchoring conditions are satisfied at the step of S120, may register with the BDB (i) a delta_n which includes all respective variations of all value information of all electronic vouchers, identifiable by all PrivTxids which represent all respective location information on where their corresponding all transactions are recorded in an n-th block of a blockchain in the private blockchain database, the n-th block including the specific issuing transaction, or (ii) all the value information of all the electronic vouchers in the n-th block of the blockchain, and may generate a representative hash value or its processed value, calculated by using a specific hash value and its corresponding one or more neighboring hash values, at the step of S121, where the specific hash value is a hash value of (i) the electronic voucher data, (ii) the public key of the specific issuer, and (iii) the signature value of the specific issuer, and where a specific neighboring hash value among the neighboring hash values includes a hash value of the delta_n or of all the value information of all the electronic vouchers, registered with the BDB, in the n-th block of the blockchain. Also, the server 100 may perform processes of (i) registering the representative hash value or its processed value with the public blockchain database 120 at the step of S122, and (ii) acquiring a Txid which represents location information on where the representative hash value or its processed value is recorded in the public blockchain database at the step of S123.

Herein, the anchoring conditions may include at least one of (i) a condition that one or more transactions related to one or more electronic vouchers are created a certain number of times, (ii) a condition that a certain amount of time is elapsed, (iii) a condition that a block is created in the private blockchain database, and (iv) a condition that has at least one of characteristics of services. Herein, the transactions related to the electronic vouchers may include issuing, using, refunding, settling, and revoking of the electronic vouchers. However, the transactions are not limited to these, and may include every status that can occur with regard to the electronic vouchers, e.g., selling and buying thereof.

The calculation by using the specific hash value and at least one of the neighboring hash values may be performed by various hash functions which may include an MD4 function, an MD5 function, an SHA-0 function, an SHA-1 function, an SHA-224 function, an SHA-256 function, an SHA-384 function, an SHA-512 function and an HAS-160 function, but not limited to these, as known to those skilled in the art. For example, a Triple SHA256 function may be further included.

Herein, the server 100 may store and manage the specific hash value and the at least one neighboring hash value in a certain data structure. Herein, the data structure may vary and one example may be a Merkle tree.

In other words, the server 110 may create a Merkle tree whose specific leaf node has the specific hash value, and if the anchoring conditions are satisfied, the server 110 may register with the public blockchain database 120 the representative hash value or its processed value, where the representative hash value is calculated by using the specific hash value and at least one hash value of at least one neighboring node which corresponds to the node of the specific hash value.

More specifically, (x1) the server 100 may calculate an intermediate value by using (i) the specific hash value and (ii) a hash value allocated to a sibling node of a specific leaf node where the specific hash value is allocated, and may allocate a hash value of the intermediate value to a parent node of the specific leaf node. (x2) If the parent node is a root node of the Merkle tree, the hash value allocated to the parent node becomes the representative hash value. (x3) On the contrary, if the parent node is not the root node, the server 100 may repeat the process from (x1) to (x3) by regarding the hash value allocated to the parent node as the specific hash value and regarding the parent node as the specific leaf node.

The server 100 may register the hash value allocated to the root node as the representative hash value with the public blockchain database 120. Herein, the processed value of the representative hash value may be registered. For example, a value from hex operation of the representative hash value may be registered.

On the other hand, if the server 100 stores the specific hash value and the at least one neighboring hash value in a first data structure and then stores and manages a second data structure identical in a form to the first data structure, the first data structure and the second data structure may be connected in a form of a chain.

Especially, as aforementioned, if the first data structure and the second data structure are Merkle trees, a root value of the first data structure or a hash value of the root value may be allocated to a first leaf node of the second data structure.

Moreover, data integrity may be further ensured by verifying the first data structure when the second data structure is created. The verification of the second data structure will be explained later.

If the Merkle tree is a first Merkle tree among two or more Merkle trees linked in chains, a hash value of a message data or its processed value, which includes text, numbers or symbols, may be allocated to a first leaf node of the Merkle tree. For example, at the time of creation of the Merkle tree, a hash value of a first input message given by the server 100 may be allocated.

Figure 3:
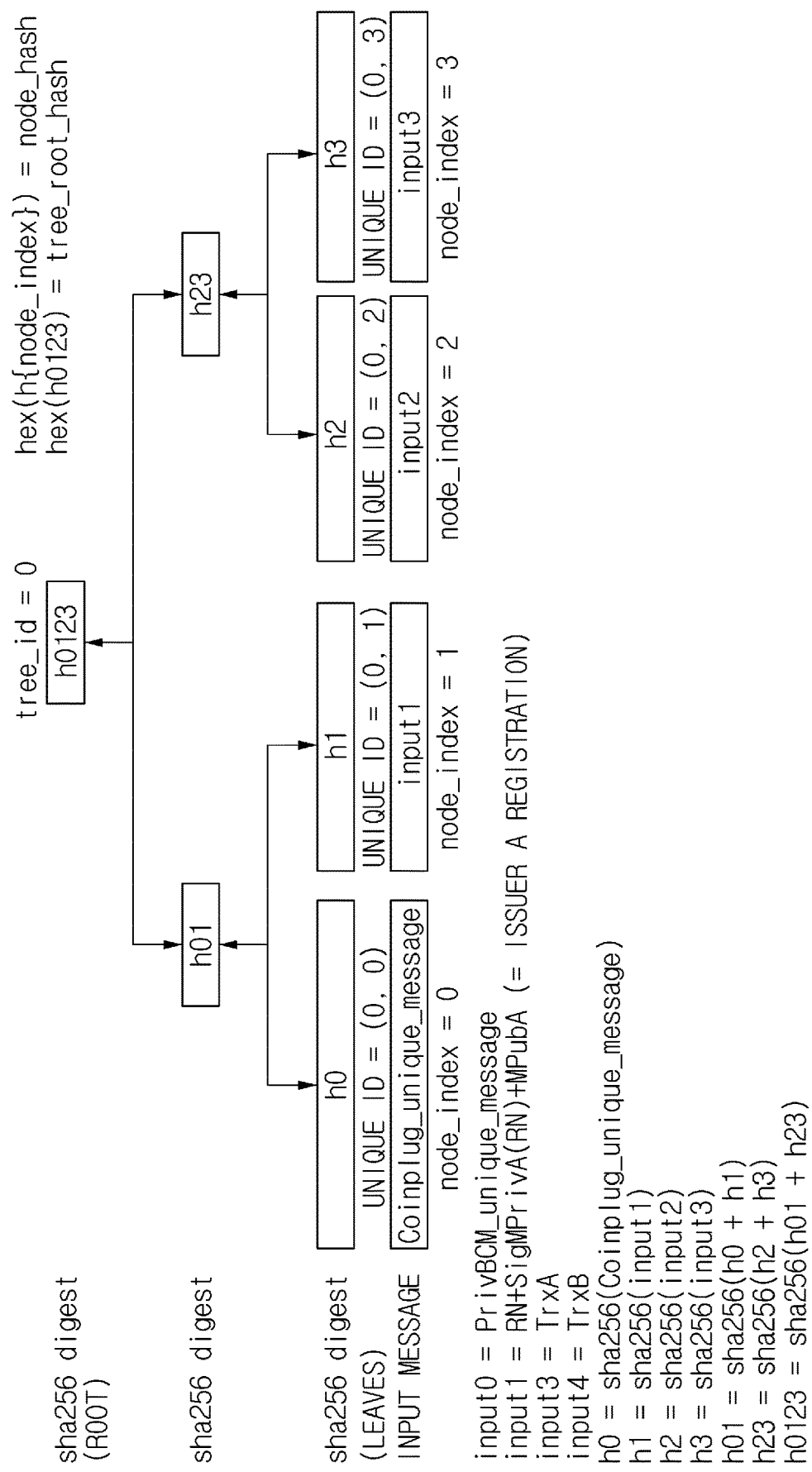
FIGS. 3 and 4 are diagrams schematically illustrating a process of registering an issuing transaction for the electronic voucher with a public blockchain database in accordance with one example embodiment of the present invention.
Figure 4:
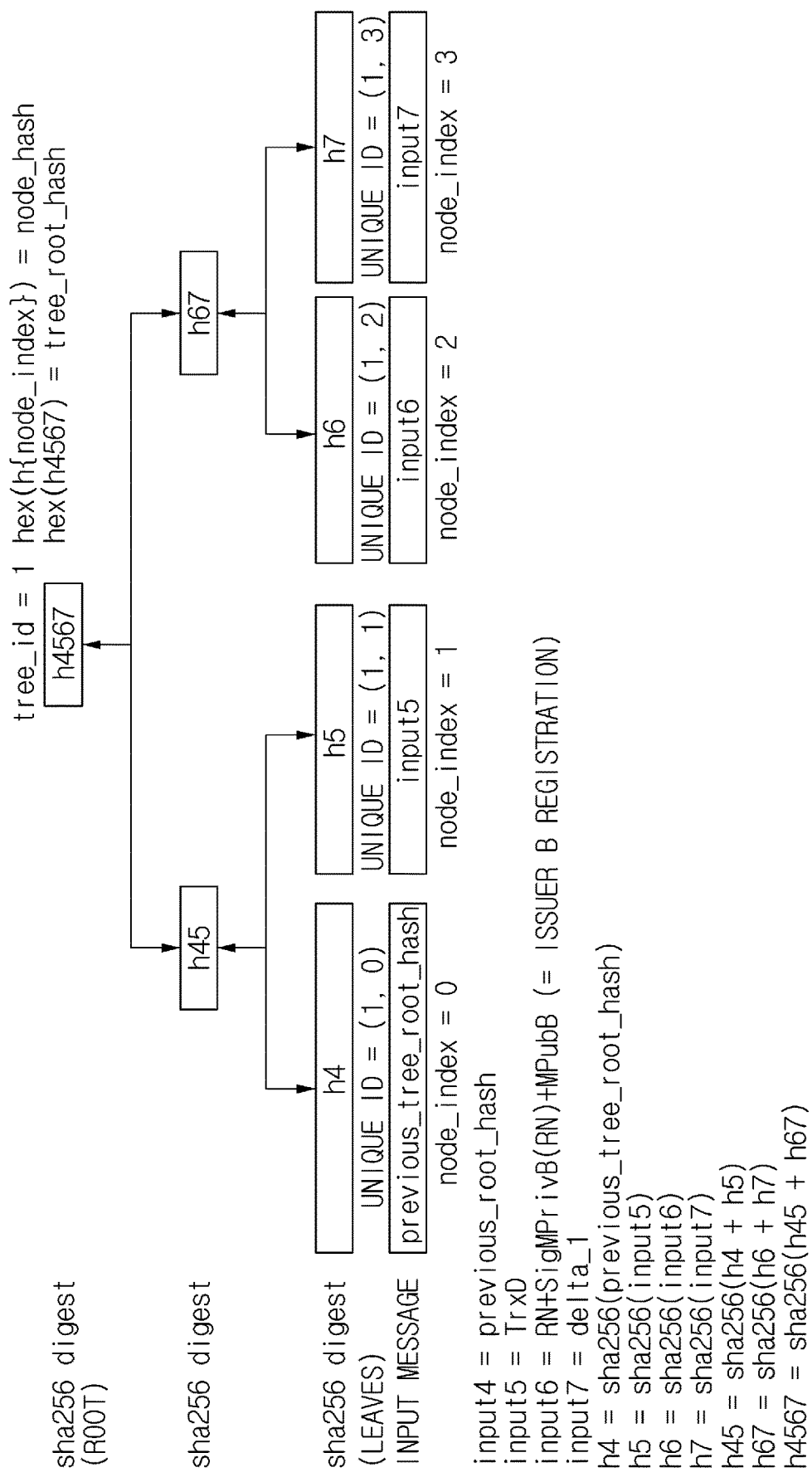

FIGS. 3 and 4 are diagrams illustrating examples of Merkle trees created in accordance with one example embodiment of the present invention.

FIG. 3 illustrates a Merkle tree with four leaf nodes. As the illustrated Merkle tree is the first Merkle tree whose tree_id is zero, a hash value (sha256digest(Coinplug_unique_message)) of a certain message data is allocated to an h0 node which is the first leaf node. If there is a request for registration of a transaction, the server 100 may create a leaf node next to a last leaf node of the Merkle tree currently configured and may allocate the specific hash value or its processed value to the created leaf node. For example, if an allocation of values is completed with an h1 node as a last which is a second leaf node of the Merkle tree in FIG. 3, and if a new leaf node is to be created, then an h2 node which is a next leaf node may be created and the specific hash value or its processed value (sha256digest(input2)) may be allocated to the h2 node. Further, the server 100 may calculate by using (i) the specific hash value allocated to the h2 node and (ii) a hash value allocated to an h3 node which is a sibling node of the h2 node. The hash value of the calculated value may be allocated to an h23 node which is a parent node of the h2 node and the h3 node. As the parent node, i.e., the h23 node, is not the root node of the Merkle tree, the server 100 may repeat the process by regarding the hash value allocated to the h23 node as the specific hash value. In other words, with the hash value allocated to the h23 node as the specific hash value, the hash values allocated to the h23 node and an h01 node may be used together to be calculated and allocated to an h0123 node which is a parent node of the h23 node and the h01 node. Herein, as the h0123 node is the root node, the server 100 may register the processed value (hex(h{node_index})) of the hash value allocated to the h0123 node with the public blockchain database 120.

On the other hand, for example, if the number of multiple issuing transactions of the electronic vouchers equals the number of leaf nodes in a Merkle tree to be created and the multiple issuing transactions are acquired, the server 100 may create the Merkle tree and may register the root value of the Merkle tree with the public blockchain database 120.

Also, the server 100 may create a root value of the Merkle tree aforementioned at stated intervals, by referring to the condition (ii) above. In this case, the server 100, if a certain amount of time is elapsed, may create a Merkle tree by referring to input values by the time, and may register the root value of the Merkle tree with the public blockchain database 120.

However, in this case, a value may not be allocated to a sibling node of the node to which the specific hash value is allocated even though a certain amount of time is elapsed. In case no hash value is allocated to the sibling node even though the anchoring conditions are satisfied, the server 100 may allocate a certain hash value to the sibling node to thereby produce a root value of the Merkle tree by the method aforementioned. For example, the server 100 may copy and allocate the specific hash value to the sibling node.

Further, the server 100 may store a BDB header hash value in a block header of the n-th block when the n-th block is created, as the above condition (iii), in the private blockchain database, where the BDB header hash value is a hash value calculated from the delta_n or all the value information of all the electronic vouchers, registered with the BDB, in the n-th block of the blockchain.

As one example, on condition that (i) a seller-buyer hash value is generated from a Merkle tree whose leaf nodes include hash values calculated by using at least one random nonce, at least one signature value of the random nonce, and at least one public key, (ii) a voucher transaction hash value is generated from a Merkle tree whose leaf nodes include hash values calculated by using (ii-1) all electronic voucher data having information on issuing, using, refunding, settling or revocating of all the electronic vouchers, (ii-2) at least one public key and (ii-3) at least one signature value, and (iii) the seller-buyer hash value and the voucher transaction hash value are further stored in the block header of the n-th block, the server 100 may register the BDB header hash value, the seller-buyer hash value and the voucher transaction hash value or their processed values with the public blockchain database. Herein, the seller-buyer hash value and the voucher transaction hash value may be the representative hash values.

Further, on condition that (I) a private representative hash value is generated from a Merkle tree whose leaf nodes include (i) at least one hash value calculated by using at least one random nonce, at least one signature value of the random nonce and at least one public key, and (ii) at least one hash value calculated by using (ii-1) all electronic voucher data having information on issuing, using, refunding, settling or revocating of all the electronic vouchers, (ii-2) at least one public key and (ii-3) at least one signature value, and that (II) the private representative hash value is further stored in the block header of the n-th block, the server 100 may register the BDB header hash value and the private representative hash value or their processed values with the public blockchain database.

The characteristics of services may be at least part of information on a cost paid by the specific issuer who requested issuing of the electronic voucher, information on a time-zone during which the registration of the issuing transaction is performed, information on a location where the registration service of the issuing transaction is provided and information on a type of a company that requested the registration of the issuing transaction. However, they are not limited to these.

Meanwhile, if a creation of a new Merkle tree starts and if the anchoring conditions are satisfied without the issuing transaction, the server 100 may create the new Merkle tree by allotting certain message data to its first and second leaf nodes and may register the root value of the new Merkle tree or its processed value with the public blockchain database 120. In this case, the new Merkle tree with two leaf nodes may be created.

FIG. 4 is a diagram illustrating an example of a Merkle tree created in the form of the second data structure in accordance with one example embodiment of the present invention.

By referring to FIG. 4, it is clear that the root value hex(h0123) of the Merkle tree whose tree_id is zero in FIG. 3 is allocated as sha256digest(input4) to the first leaf node which is an h4 node of a new Merkle tree. In such a manner, the present invention has advantage of improving data integrity, as tracking becomes easier even in the case of data forgery, by connecting multiple data structures created when a transaction occurs.

Next, the process of verifying the issuing transaction of the electronic voucher registered by using the data structure aforementioned is explained.

On condition that the server 100 already acquired the issuing transaction for the electronic voucher, and that the aforementioned representative hash value or its processed value referred here for convenience as a first representative hash value, which is calculated by using (i) the aforementioned specific hash value referred here for convenience as a first specific hash and (ii) its corresponding, under a certain condition, at least one neighboring hash value, is registered with the public blockchain database 120, the server 100 may acquire a verification request related to the issuing transaction. Then if a second representative hash value or its processed value, generated by using input data included in the verification request, corresponds to the first representative hash value or its processed value registered with the public blockchain database 120, the server 100 may determine that the verification related to the issuing transaction is completed. Herein, the first specific hash value may be at least one of (i) a hash value of the issuing transaction signed with a private key of the server, (ii) a hash value of the issuing transaction signed with the private key of the server and the private key of the specific issuer.

Further, the second representative hash value may be calculated by using a second specific hash value and its corresponding at least one neighboring hash value. Herein, the second specific hash value may be a hash value of data of the verification request included in input data which is signed with (i) the private key of the server, or (ii) the private key of the server and the private key of the specific issuer.

Herein, the input data included in the verification request may include at least one of (i) the data of the verification request, (ii) a message digest of the data of the verification request, or (iii) an ID issued at the time of registration of the issuing transaction.

If the input data includes the data of the verification request, the message digest of the data of the verification request may be generated by the aforementioned method, and the second specific hash value may be generated based on the message digest. Further, the second representative hash value may be calculated by using the second specific hash value and its corresponding at least one neighboring hash value.

If the input data includes the ID issued at the time of registering the issuing transaction, the second specific hash value may be set to a value allocated to a leaf node, in the Merkle tree created previously, corresponding to the ID.

The explanation of the first specific hash value aforementioned may be applied to the second specific hash value. In other words, the calculation using the second specific hash value and at least one neighboring hash value may be performed by various hash functions. Thus similar part of the explanation thereof is omitted by referring to the above.

Further, the calculation of the specific hash value and a value of at least one neighboring node which corresponds to the node of the specific hash value may be performed by using the Merkle tree. If the verification request related to the issuing transaction is acquired, the server 100 may identify information on the Merkle tree and its leaf nodes related to the input data.

The second representative hash value may be calculated by using the second specific hash value and a hash value allocated to at least one other leaf node which corresponds to the node of the second specific hash value in the Merkle tree.

The server 100, if the verification request is obtained, may acquire an OP message from the public blockchain database 120 by referring to an issuing transaction ID for the electronic voucher. Further, if the second representative hash value or its processed value, generated by using the input data included in the verification request, corresponds to the first representative hash value or its processed value included in the OP message, the server 100 may determine that the verification related to the issuing transaction is completed.

On the other hand, a transaction ID may be included in the input data. That is, the specific issuer may transmit the transaction ID to the server 100 at the time of verification request together with at least one of (i) the data of the verification request, (ii) the message digest of the data of the verification request, or (iii) the ID issued at the time of registration of the issuing transaction.

In a process of the verification, the server 100 may create a new Merkle tree, by using an existing Merkle tree created at the aforementioned process of registration of the issuing transaction with the public blockchain database. Herein, the new Merkle tree is acquired by allocating the second specific hash value to a specific leaf node in the existing Merkle tree, where the specific leaf node is selected among the leaf nodes of the existing Merkle tree by referring to information on which leaf node is replaced by the second specific hash value. In other words, the server 100 may (y1) calculate by using (i) the second specific hash value allocated, in place of a hash value of the specific leaf node, to the new Merkle tree and (ii) a hash value allocated to a corresponding sibling node, in the new Merkle tree, of the specific leaf node, and may allocate a hash value of the calculated value to their parent node in the new Merkle tree. Further, the server 100, (y2) if the parent node is the root node of the new Merkle tree, may compare a hash value allocated to the parent node, setting it as the second representative hash value, with the value included in the OP message, and (y3) if the parent node is not the root node of the new Merkle tree, may repeat the steps of (y1) to (y3) by regarding a hash value allocated to the parent node as the second specific hash value.

Further, if the root value or its processed value of the New Merkle tree corresponds to the first representative hash value or its processed value included in the OP message, the server 100 may determine that the verification related to the issuing transaction is completed.

In the present invention, if a Merkle with nm or N leaf nodes is created at the step of the registration of the issuing transaction, fast integrity verification of the issuing transaction may be possible in which computation corresponding to only the height log nN or m of the Merkle tree is performed.

On the other hand, if the input data is acquired, the server 100 may identify at least one of information on a Merkle tree and information on its leaf nodes related to the input data by referring to time information related to the input data.

Hereinafter, the verification process is explained by taking an example illustrated in FIG. 3.

By referring to FIG. 3 again, if verification of input 2 is requested, the server 120 may identify information on the existing Merkle tree and its leaf nodes, by referring to information on the input data, and transmit a certain transaction ID corresponding to the information on the existing Merkle tree whose tree_id is zero to the public blockchain database 120, to thereby acquire the OP message from the public blockchain database 120. Then, the server 100 may create the new Merkle tree by using the input 2. The server 100 may calculate by using (i) the input 2 allocated in place of a hash value in the h2 node and (ii) a hash value allocated to an h3 node which is a sibling node of the h2 node in the new Merkle tree, because the hash value sha256digest (input2) of the input 2 is allocated to the h2 node. The hash value of the calculated value may be allocated to an h23 node which is a parent node of the h2 node and the h3 node. As the h23 node is not the root node of the new Merkle tree, the server 100 may repeat the above processes by regarding the hash value allocated to the h23 node as the second specific hash value. In other words, by regarding the hash value allocated to the h23 node as the second specific hash value, the hash values allocated to the h23 node and an h01 node in the existing Merkle tree may be used to calculate a hash value and this hash value may be allocated to an h0123 node which is a parent node of the h23 node and the h01 node. Herein, as the h0123 node is the root node of the Merkle tree, the server 100 may compare the processed value hex(h{node_index}) of the hash value allocated to the h0123 node with the value included in the OP message.

Figure 5:
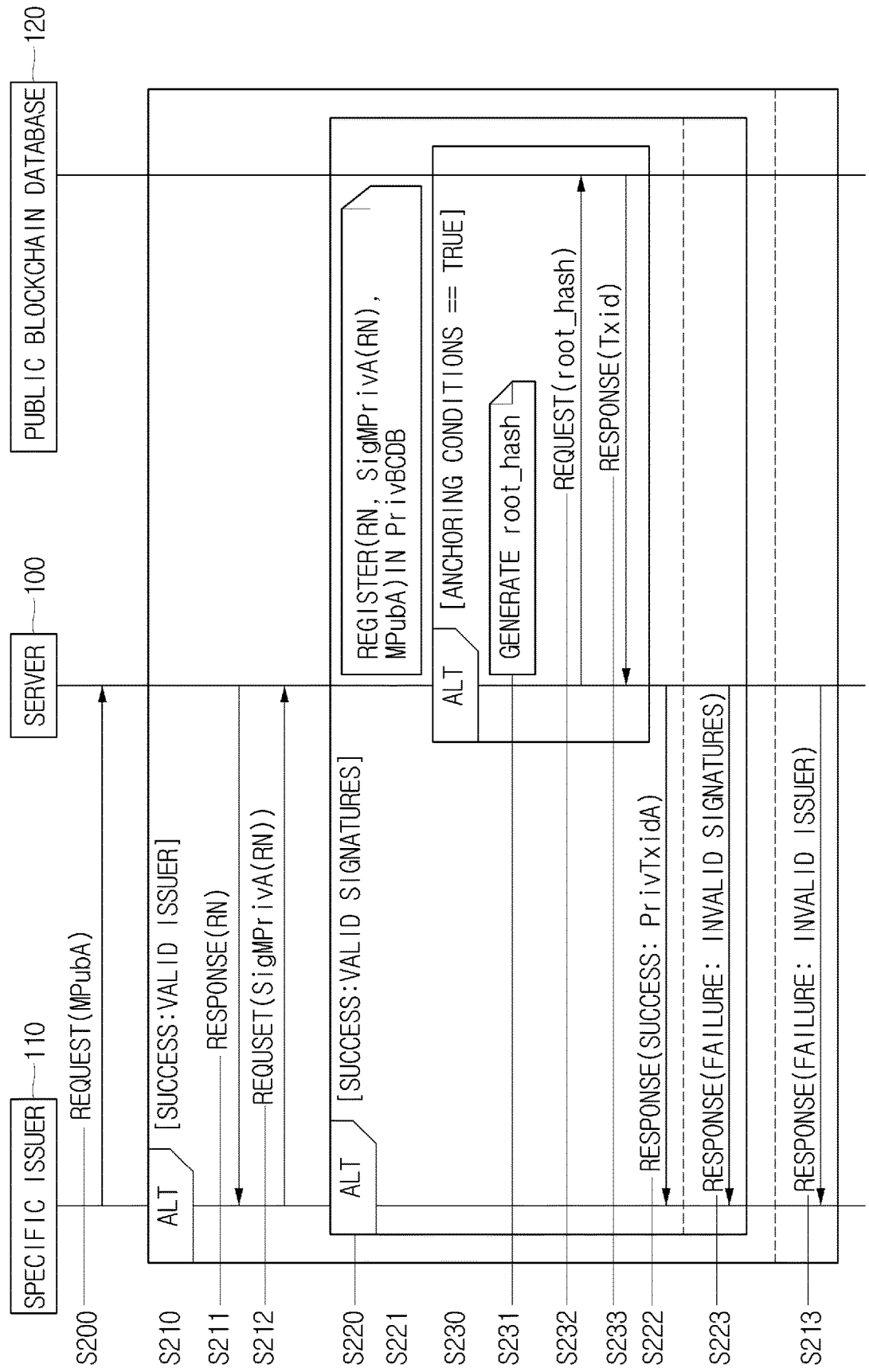
FIG. 5 is a diagram schematically illustrating a method of registering an issuer of the electronic voucher in accordance with one example embodiment of the present invention.

Next, by referring to FIG. 5, a process of registering the specific issuer 110 is described as follows.

If a request for registration of the specific issuer 100 with the public key thereof, i.e., MPubA, is acquired at the step of S200, the server may validate the specific issuer 100 at the step of S210, and may transmit a random nonce (RN) to the specific issuer 110 who is determined as valid at the step of S211. If the specific issuer 110 is determined as invalid, for example, if the specific issuer is an identity thief, the server 100 may notify the specific issuer 110 of a fact of a failed confirmation of the specific issuer at the step of S213.

Specifically, on condition that the specific issuer created a private key (MPrivA) and a public key (MPubA) using the user device, if the public key is transmitted to the server 100 for registering the specific issuer as an issuer of the electronic voucher, the server 100 may validate the specific issuer 110 who is the owner of the acquired public key. Herein, the specific issuer 100 may be validated by using a PKI based certificate or a credential of the specific issuer, but not limited to these. As one example, the specific issuer may be confirmed by a Public Key Certificate based on a PKI, an OPSign certificate, or the credential that can confirm a person, such as an SSN or a passport.

Thereafter, if a signature value SigMPrivA(RN) obtained by signing the random nonce with the private key of the specific issuer is acquired at the step of S212, the server 100 may verify that the signature value of the random nonce is legitimately signed, by using the public key of the specific issuer on the signature value, at the step of S220. In other words, the server 100 may confirm the random nonce which is acquired by using the public key of the specific issuer on the SigMPrivA(RN), and if the confirmed random nonce is identical to the random nonce transmitted to the specific issuer, then may determine the signature as valid.

Further, if the signature value acquired from the specific issuer 110 is determined as valid, the server 100 may register the registering transaction, i.e., transaction(RN, SigMPrivA (RN), MPubA), of the specific issuer including the random nonce, the signature value of the random nonce, and the public key of the specific issuer, with the private blockchain database at the step of S221, and may notify the specific issuer of a fact of a successful registration of the PrivTxid which represents location information on where the registering transaction is recorded in the private blockchain database, at the step of S222.

However, the server 100, if the signature value acquired from the specific issuer 110 is determined as invalid, may notify the specific issuer 110 of a fact of a failed confirmation of the signature value, at the step of S223.

Further, if the specific issuer and the signature value are determined as valid and if the anchoring conditions are satisfied at the step of S230, the server 100 may perform processes of (i) generating the representative hash value or its processed value calculated by using a certain hash value and its corresponding at least one neighboring hash value, at the step of S231, (ii) registering the representative hash value or its processed value with the public blockchain database, and (iii) acquiring the Txid which represents location information on where the created representative hash value or its processed value is recorded in the public blockchain database, where the certain hash value is a hash value of (i) the random nonce, (ii) the signature value of the random nonce, and (iii) the public key of the specific issuer.

Figure 6:
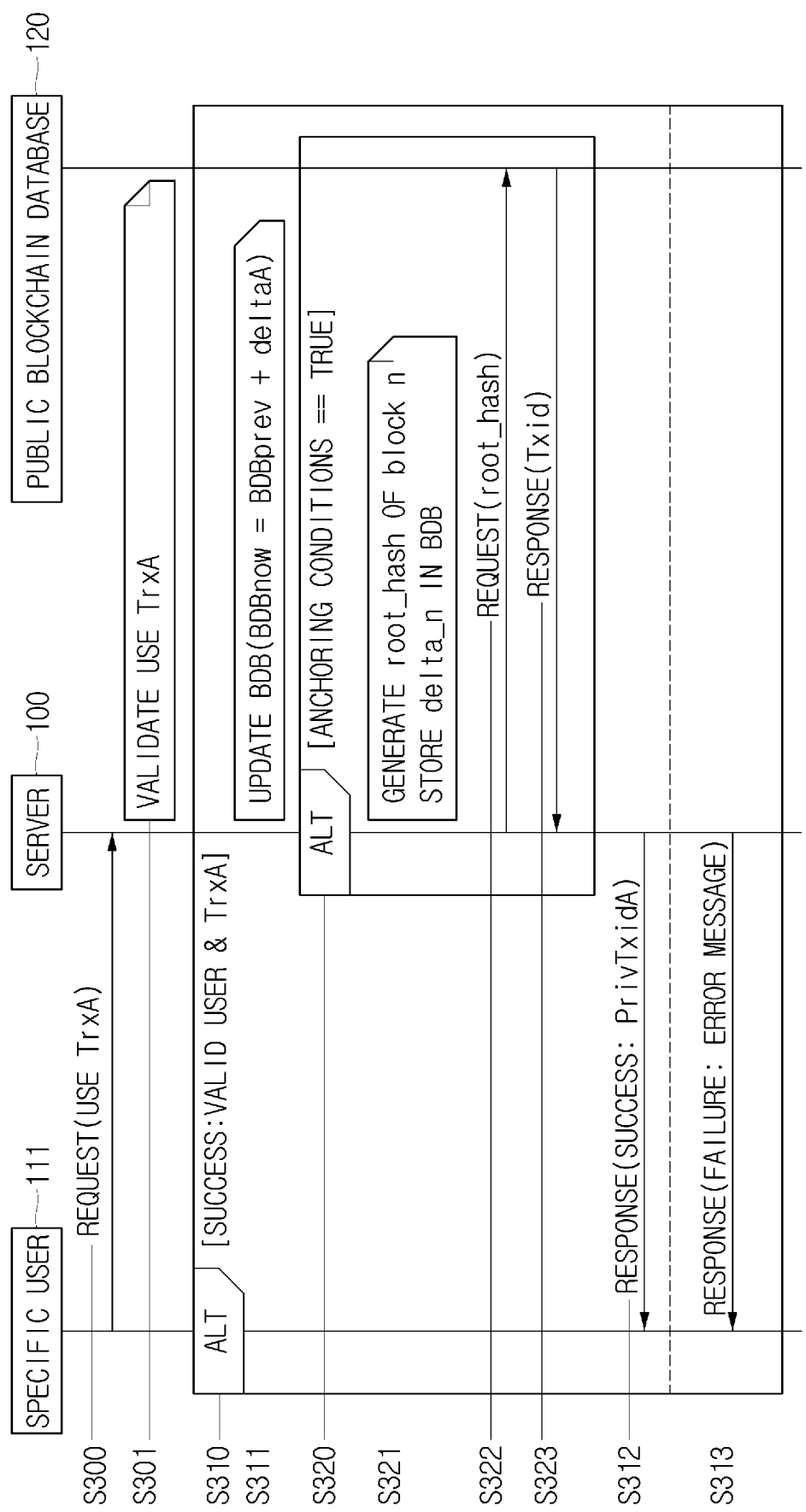
FIG. 6 is a diagram schematically illustrating a method of using the electronic voucher in accordance with one example embodiment of the present invention.

Next, by referring to FIG. 6, a method of using the electronic voucher in accordance with one example embodiment of the present invention is described as follows. A part of the following description similar to the method of issuing the electronic voucher in accordance with the present invention in FIG. 2 is omitted, as it is easily inferred from FIG. 2.

The server 100 may receive a request (request(use TrxA)) for using the electronic voucher, transmitted by the specific user 111 who bought the electronic voucher using the user device through the communication part 101, including (i) electronic voucher data having at least one of a specific unique nonce and usage value information, (ii) the public key of the specific user, and (iii) a signature value of the specific user or its processed value, which is acquired by signing a hash value of the electronic voucher data with a private key of the specific user, at the step of S300.

Herein, the electronic voucher data may further include at least one of (i) information on the type of the electronic voucher, (ii) the public key of the specific user who is a sender of the electronic voucher, (iii) a public key of a specific seller who is a receiver of the electronic voucher, (iv) the unique ID information of the specific issuer, and (v) the information on the expiration date of the electronic voucher. Herein, the information on the type of the electronic voucher is for defining a current status and may indicate usage of the electronic voucher. Further, the public key of the specific seller who accepts the electronic voucher used by the specific user may be utilized for identification of the specific seller. Clearly, the electronic voucher may be used as money or the anonymous gift certificate without the identification of its seller. The usage value information of the electronic voucher, which is information on use thereof among the value information, may include information on tangible/intangible value as in a monetary amount, a usage count, and prize information, etc. Further, a unique ID of the specific issuer may include information for identification of the specific issuer, for example, may include a hash value or its processed value of the public key of the issuer.

As one example, a transaction(TrxA) for using the electronic voucher may include 1. a type (using), 2. a unique nonce, 3. the public key of the specific user who is a sender, 4. the public key of the specific seller who is a receiver, 5. the usage value information remaining of the electronic voucher, 6. the unique ID of the specific issuer of the electronic voucher, 7. the expiration date of the electronic voucher, 8. the public key of the specific user which is a public key for identification of an actor of the current status, and 9. a signature value (SigMPrivA(1:2:3:4:5:6:7:8)) of 1, 2, 3, 4, 5, 6, 7, and 8 signed with the private key of the specific user.

Then, the server 100 may validate (i) the acquired electronic voucher data, (ii) the acquired public key of the specific user, and (iii) the acquired signature value of the specific user, at the step of S301. Further, the server 100 may validate the format of the electronic voucher data.

Then, if the electronic voucher data is determined as valid at the step of S310, the server 100 may perform a process of updating and registering the specific value information including a specific balance of the specific electronic voucher data with the BDB, at the step of S311. In other words, the previous value information (BDBprev) of the electronic voucher registered with the BDB is updated to BDBnow=BDBprev+deltaA, where BDBnow is the current value information and a deltaA is a variation caused by a specific using transaction for the electronic voucher.

The server 100, if the electronic voucher data is determined as valid at the step of S310, may register the using transaction, i.e., transaction(TrxA), for the electronic voucher including (i) the electronic voucher data, (ii) the public key of the specific user, and (iii) the signature value of the specific user, with the private blockchain database, and may notify the specific user of a fact of a successful registration of the PrivTxid which represents location information on where the specific using transaction is recorded in the private blockchain database, at the step of S312. However, the server 100, if the electronic voucher data is determined as invalid at the step of S310, may notify the specific user 111 of a fact of a failed registration with an error message indicating the failed registration, at the step of S313.

Further, the server 100, if the electronic voucher data is determined as valid, and if the anchoring conditions are satisfied at the step of S320, may register with the BDB the delta_n or all the value information of all the electronic vouchers in the n-th block of the blockchain, and may generate the representative hash value or its processed value, calculated by using the specific hash value and its corresponding one or more neighboring hash values, at the step of S321, where the specific hash value is a hash value of (i) the electronic voucher data, (ii) the public key of the specific issuer, and (iii) the signature value of the specific issuer, and where a specific neighboring hash value among the neighboring hash values includes a hash value of the delta_n or of all the value information of all the electronic vouchers, registered with the BDB, in the n-th block of the blockchain. Also, the server 100 may perform processes of (i) registering the representative hash value or its processed value with the public blockchain database at the step of S322, and (ii) acquiring the Txid which represents location information on where the representative hash value or its processed value is recorded in the public blockchain database at the step of S323.

Next, a process of the server 100 registering the specific user is described as follows. The registration process of the specific user is similar to the registration process of the specific issuer as in FIG. 5, and thus similar part of the explanation is omitted.

If a request for registration of the specific user 111 with the public key thereof is acquired, the server 100 may validate the specific user 111, and may transmit a random nonce to the specific user 111 who is determined as valid. If the specific user 111 is determined as invalid, the server 100 may notify the specific user 111 of a fact of a failed confirmation of the specific user.

Thereafter, if a signature value obtained by signing the random nonce with the private key of the specific user 111 is acquired, the server 100 may verify that the signature value of the random nonce is legitimately signed, by using the public key of the specific user 111 on the signature value.

Further, if the signature value acquired from the specific user 111 is determined as valid, the server 100 may register a registering transaction of the specific user including the random nonce, the signature value of the random nonce, and the public key of the specific user, with the private blockchain database, and may provide the specific user 111 with the PrivTxid which represents location information on where the registering transaction of the specific user is recorded in the private blockchain database.

However, the server 100, if the signature value acquired from the specific user 111 is determined as invalid, may notify the specific user 111 of a fact of a failed confirmation of the signature value.

Further, if the specific issuer and the signature value are determined as valid and if the anchoring conditions are satisfied, the server 100 may perform processes of (i) generating the representative hash value or its processed value calculated by using a certain hash value and its corresponding at least one neighboring hash value, (ii) registering the representative hash value or its processed value with the public blockchain database, and (iii) acquiring the Txid which represents location information on where the created representative hash value or its processed value is recorded in the public blockchain database, where the certain hash value is a hash value of (i) the random nonce, (ii) the signature value of the random nonce, and (iii) the public key of the specific user.

Figure 7:
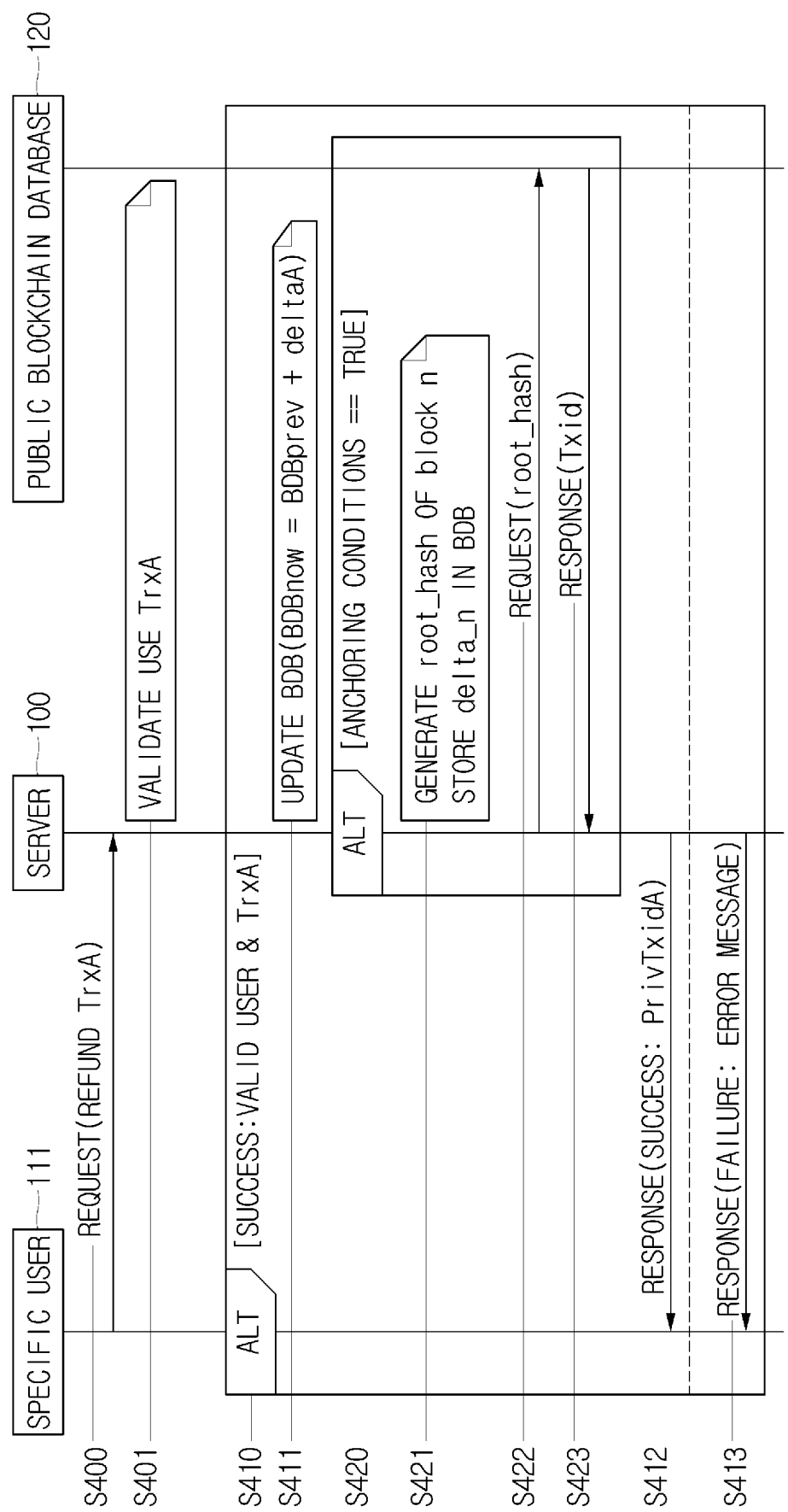
FIG. 7 is a diagram schematically illustrating a method of refunding the electronic voucher in accordance with one example embodiment of the present invention.

Next, by referring to FIG. 7, a method of refunding the electronic voucher in accordance with one example embodiment of the present invention is described as follows. A part of the following description similar to the method of issuing the electronic voucher in accordance with the present invention in FIG. 2 is omitted, as it is easily inferred from FIG. 2.

The server 100 may receive a request (request(refund TrxA)) for refunding the electronic voucher, through the communication part 100 transmitted from the user device of the specific user 111 who bought the electronic voucher, including (i) electronic voucher data having at least one of a specific unique nonce and refund value information, (ii) the public key of the specific user, and (iii) the signature value of the specific user or its processed value, which is acquired by signing a hash value of the electronic voucher data with the private key of the specific user, at the step of S400.

Herein, the electronic voucher data may further include at least one of (i) information on the type of the electronic voucher, (ii) the public key of the specific user who is a sender of the electronic voucher, (iii) the public key of the specific issuer who is an issuer, i.e., a receiver, of the electronic voucher, (iv) unique ID information of the specific issuer, and (v) information on the expiration date of the electronic voucher. Herein, the information on the type of the electronic voucher may indicate refund of the electronic voucher.

As one example, a transaction(TrxA) for refunding the electronic voucher may include 1. a type (refunding), 2. a unique nonce, 3. the public key of the specific user who is a sender, 4. the public key of the specific issuer who is a receiver, 5. refund value information of the electronic voucher, 6. the unique ID of the specific issuer of the electronic voucher, 7. the expiration date of the electronic voucher, 8. the public key of the specific user which is a public key for identification of an actor of the current status, and 9. a signature value (SigMPrivA(1:2:3:4:5:6:7:8)) of 1, 2, 3, 4, 5, 6, 7, and 8 signed with the private key of the specific user.

Then, the server 100 may validate (i) the acquired electronic voucher data, (ii) the acquired public key of the specific user, and (iii) the acquired signature value of the specific user, at the step of S401.

Then, if the electronic voucher data is determined as valid at the step of S410, the server 100 may perform a process of updating and registering the specific refund value information including the specific balance of the specific electronic voucher data with the BDB, at the step of S411. In other words, the previous value information (BDBprev) of the electronic voucher registered with the BDB is updated to BDBnow=BDBprev+deltaA, where a deltaA is a variation caused by a specific refunding transaction for the electronic voucher. Herein, the variation caused by the specific refunding transaction for the electronic voucher may be same as the refund value information.

The server 100, if the electronic voucher data is determined as valid, may register the specific refunding transaction, i.e., transaction(TrxA), for the electronic voucher including (i) the electronic voucher data, (ii) the public key of the specific user, and (iii) the signature value of the specific user, with the private blockchain database, and may notify the specific user 111 of a fact a successful registration of the PrivTxid which represents location information on where the specific refunding transaction is recorded in the private blockchain database, at the step of S412. However, the server 100, if the electronic voucher data is determined as invalid at the step of S410, may notify the specific user 111 of a fact of a failed registration with an error message indicating the failed registration, at the step of S413.

Further, the server 100, if the electronic voucher data is determined as valid, if the anchoring conditions are satisfied at the step of S420, may generate the representative hash value or its processed value, calculated by using a specific hash value and its corresponding one or more neighboring hash values, at the step of S421, where the specific hash value is a hash value of (i) the electronic voucher data, (ii) the public key of the specific user, and (iii) the signature value of the specific user, and where a specific neighboring hash value among the neighboring hash values includes a hash value of the delta_n or of all the value information of all the electronic vouchers, registered with the BDB, in the n-th block of the blockchain. Also, the server 100 may perform processes of (i) registering the representative hash value or its processed value with the public blockchain database at the step of S422, and (ii) acquiring the Txid which represents location information on where the representative hash value or its processed value is recorded in the public blockchain database at the step of S423.

Figure 8:
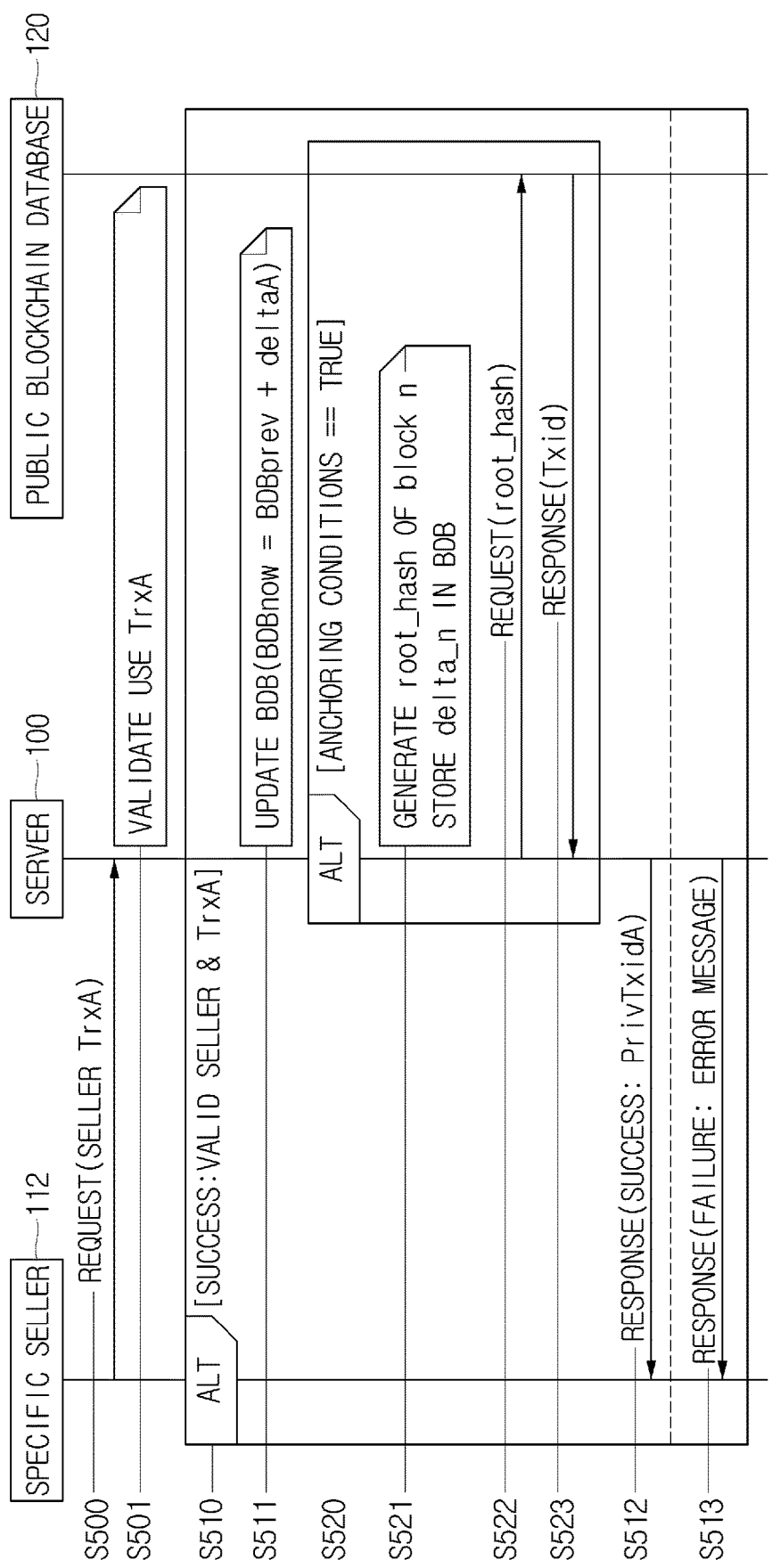
FIG. 8 is a diagram schematically illustrating a method of settling the electronic voucher in accordance with one example embodiment of the present invention.

Next, by referring to FIG. 8, a method of settling the electronic voucher in accordance with one example embodiment of the present invention is described as follows. A part of the following description similar to the method of issuing the electronic voucher in accordance with the present invention in FIG. 2 is omitted, as it is easily inferred from FIG. 2.

The server 100 may receive a request (request(seller TrxA) for settling the electronic voucher, through the communication part 100 transmitted from the user device of the specific seller 112, who accepted the electronic voucher for a return service such as goods and services, including (i) electronic voucher data having at least one of a specific unique nonce and settling value information, (ii) the public key of the specific seller, and (iii) the signature value of the specific seller or its processed value, which is acquired by signing a hash value of the electronic voucher data with a private key of the specific seller, at the step of S500.

Herein, the electronic voucher data may further include at least one of (i) information on the type of the electronic voucher, (ii) the public key of the specific seller who is a sender of the electronic voucher, (iii) the public key of the specific issuer who is an issuer, i.e., a receiver, of the electronic voucher, (iv) unique ID information of the specific issuer. Herein, the information on the type of the electronic voucher may indicate settling of the electronic voucher. Further, the settling value information of the electronic voucher may be information on a value received by the specific seller as a return service such as goods and services.

As one example, a transaction(TrxA) for settling the electronic voucher may include 1. a type (settling), 2. a unique nonce, 3. the public key of the specific seller who is a sender, 4. the public key of the specific issuer who is a receiver, 5. the settling value information of the electronic voucher, 6. the unique ID of the specific issuer of the electronic voucher, 7. the expiration date (none) of the electronic voucher, 8. the public key of the specific seller which is a public key for identification of an actor of the current status, and 9. a signature value (SigMPrivA(1:2:3:4:5:6:7:8)) of 1, 2, 3, 4, 5, 6, 7, and 8 signed with the private key of the specific seller.

Then, the server 100 may validate (i) the acquired electronic voucher data, (ii) the acquired public key of the specific seller, and (iii) the acquired signature value of the specific seller, at the step of S501. Further, the server 100 may validate the format of the electronic voucher data.

Then, if the electronic voucher data is determined as valid at the step of S510, the server 100 may perform a process of updating and registering the value information including a balance of the electronic voucher data with the BDB, at the step of S511. In other words, previous value information (BDBprev) of the electronic voucher registered with the BDB is updated to BDBnow=BDBprev+deltaA, where a deltaA is a variation caused by a specific settling transaction for the electronic voucher. Herein, the variation of the balance may be the settling value information.

The server 100, if the electronic voucher data is determined as valid, may register the specific settling transaction, i.e., transaction(TrxA), for the electronic voucher including (i) the electronic voucher data, (ii) the public key of the specific seller, and (iii) the signature value of the specific seller, with the private blockchain database, and may provide the specific seller 112 with the PrivTxid which represents location information on where the specific settling transaction is recorded in the private blockchain database, at the step of S512. However, the server 100, if the electronic voucher data is determined as invalid at the step of S510, may notify the specific seller 112 of a failure with an error message indicating the failure, at the step of S513.

Further, the server 100, if the electronic voucher data is determined as valid, if the anchoring conditions are satisfied at the step of S520, may generate the representative hash value or its processed value, calculated by using a specific hash value and its corresponding one or more neighboring hash values, at the step of S521, where the specific hash value is a hash value of (i) the electronic voucher data, (ii) the public key of the specific seller, and (iii) the signature value of the specific seller, and where a specific neighboring hash value among the neighboring hash values includes (i) a hash value of the delta_n or all the value information of all the electronic vouchers, registered with the BDB, in the n-th block of the blockchain. Also, the server 100 may perform processes of (i) registering the representative hash value or its processed value with the public blockchain database at the step of S522, and (ii) acquiring the Txid which represents location information on where the representative hash value or its processed value is recorded in the public blockchain database at the step of S523.

Next, a process of the server 100 registering the specific seller is described as follows. The registration process of the specific seller is similar to the registration process of the specific issuer as in FIG. 5, and thus similar part of the explanation is omitted.

If a request for registration of the specific seller 112 with the public key thereof is acquired, the server 100 may validate the specific seller 112, and may transmit a random nonce to the specific seller 112 who is determined as valid. If the specific seller 112 is determined as invalid, the server 100 may notify the specific seller 112 of a fact of a failed confirmation of the specific seller.

Thereafter, if the specific seller 112 is determined as valid, and if a signature value obtained by signing the random nonce with the private key of the specific seller is acquired, the server 100 may verify that the signature value of the random nonce is legitimately signed, by using the public key of the specific seller on the signature value.

Further, if the signature value acquired from the specific seller 112 is determined as valid, the server 100 may register the registering transaction of the specific seller including the random nonce, the signature value of the random nonce, and the public key of the specific seller, with the private blockchain database, and may provide the specific seller 112 with the PrivTxid which represents location information on where the registering transaction is recorded in the private blockchain database.

However, the server 100, if the signature value acquired from the specific seller 112 is determined as invalid, may notify the specific seller 112 of a fact of a failed confirmation of the signature value.

Further, if the specific seller and the signature value are determined as valid and if the anchoring conditions are satisfied, the server 100 may perform processes of (i) generating the representative hash value or its processed value calculated by using a certain hash value and its corresponding at least one neighboring hash value, (ii) registering the representative hash value or its processed value with the public blockchain database, and (iii) acquiring the Txid which represents location information on where the created representative hash value or its processed value is recorded in the public blockchain database, where the certain hash value is a hash value of (i) the random nonce, (ii) the signature value of the random nonce, and (iii) the public key of the specific seller.

Figure 9:
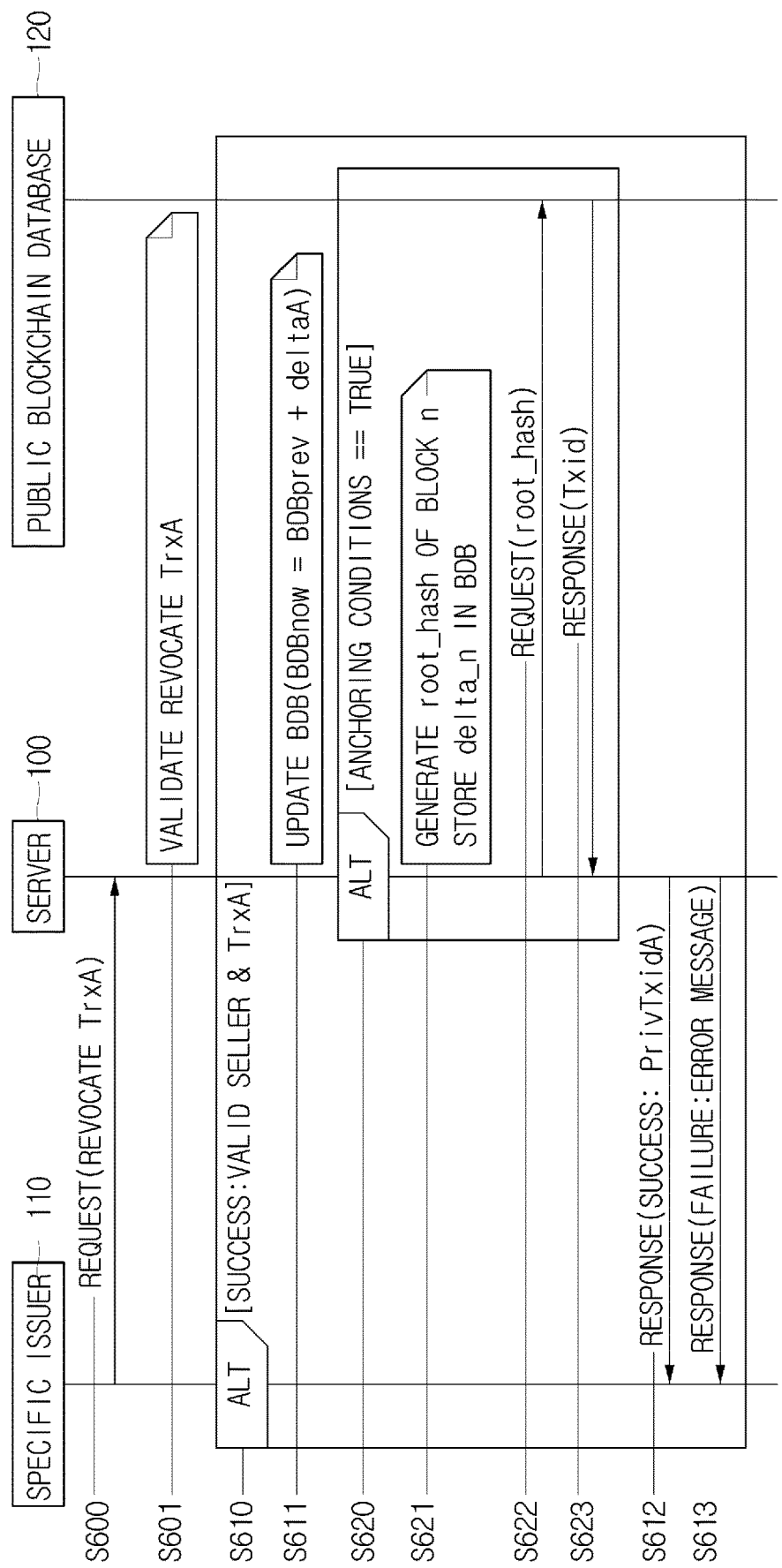
FIG. 9 is a diagram schematically illustrating a method of revocating the electronic voucher in accordance with one example embodiment of the present invention.

Next, by referring to FIG. 9, a method of revoking the electronic voucher in accordance with one example embodiment of the present invention is described as follows. A part of the following description similar to the method of issuing the electronic voucher in accordance with the present invention in FIG. 2 is omitted, as it is easily inferred from FIG. 2.

The server 100 may receive a request (request(revocate TrxA)) for revoking the electronic voucher, through the communication part 101 transmitted from the specific issuer 110, including (i) electronic voucher data having at least one of a unique nonce and revocation value information, (ii) the public key of the specific issuer, and (iii) a signature value of the specific issuer or its processed value, which is acquired by signing a hash value of the electronic voucher data, with the private key of the specific issuer, at the step of S600.

Herein, the electronic voucher data may further include at least one of (i) information on the type of the electronic voucher, (ii) the public key of the specific user who is a sender of the electronic voucher, (iii) the public key of the specific issuer who is a receiver of the electronic voucher, (iv) the unique ID information of the specific issuer. Herein, the information on the type of the electronic voucher may indicate revocation of the electronic voucher.

As one example, a transaction(TrxA) for revoking the electronic voucher may include 1. a type (revocation), 2. a unique nonce, 3. the public key of the specific user who is a sender, 4. the public key of the specific issuer who is a receiver, 5. the revocation value information of the electronic voucher, 6. the unique ID of the specific issuer of the electronic voucher, 7. the expiration date (none) of the electronic voucher, 8. the public key of the specific issuer which is a public key for identification of an actor of the current status, and 9. a signature value (SigMPrivA(1:2:3:4:5:6:7:8)) of 1, 2, 3, 4, 5, 6, 7, and 8 signed with the private key of the specific issuer.

Then, the server 100 may validate (i) the acquired electronic voucher data, (ii) the acquired public key of the specific issuer, and (iii) the acquired signature value of the specific issuer, at the step of S601. Further, the server 100 may validate the format of the electronic voucher data.

Then, if the electronic voucher data is determined as valid at the step of S610, the server 100 may perform a process of updating and registering the value information including a balance of the electronic voucher data with the BDB, at the step of S611. In other words, the previous value information (BDBprev) of the electronic voucher registered with the BDB is updated to BDBnow=BDBprev+deltaA, where a deltaA is a variation caused by the specific revocating transaction for the electronic voucher.

The server 100, if the electronic voucher data is determined as valid, may register the revocating transaction, i.e., transaction(TrxA), for the electronic voucher including (i) the electronic voucher data, (ii) the public key of the specific issuer, and (iii) the signature value of the specific issuer, with the private blockchain database, and may notify the specific issuer 110 of a successful registration of the PrivTxid which represents location information on where the revocating transaction is recorded in the private blockchain database, at the step of S612. However, the server 100, if the electronic voucher data is determined as invalid at the step of S610, may notify the specific issuer 110 of a failure with an error message indicating the failure, at the step of S613.

Further, the server 100, if the electronic voucher data is determined as valid, if the anchoring conditions are satisfied at the step of S620, may generate the representative hash value or its processed value, calculated by using a specific hash value and its corresponding one or more neighboring hash values, where the specific hash value is a hash value of (i) the electronic voucher data, (ii) the public key of the specific issuer, and (iii) the signature value of the specific issuer, and where a specific neighboring hash value among the neighboring hash values includes a hash value of the delta_n or of all the value information of all the electronic vouchers, registered with the BDB, in the n-th block of the blockchain, at the step of S621. Also, the server 100 may perform processes of (i) registering the representative hash value or its processed value with the public blockchain database at the step of S622, and (ii) acquiring the Txid which represents location information on where the representative hash value or its processed value is recorded in the public blockchain database at the step of S623.

The present invention has an effect of improving reliability and security of the electronic voucher by registering the electronic voucher with the blockchain of the virtual currency to prevent forgery or illegal copying.

The present invention has another effect of improving reliability and security of the electronic voucher by using hash functions and cryptography to prevent forgery and illegal copying.

The present invention has another effect of improving reliability and security of the electronic voucher by registering the electronic voucher with the blockchain of the virtual currency to prevent multiple issuance of a same electronic voucher.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method of using at least one specific electronic voucher by at least one specific user, comprising steps of:
   (a)
      (a-1) creating, by a server, a specific using transaction, for the specific electronic voucher, the specific using transaction including (i) a specific electronic voucher data having at least one of a specific nonce and specific value information of the specific electronic voucher, (ii) a public key of the specific user, and (iii) a signature value of the specific user, wherein the signature value is acquired by signing a hash value or a processed value of the specific electronic voucher data with a private key of the specific user;
      registering, by the server, the specific using transaction with a private blockchain database such that the specific using transaction is included in an n-th block of a blockchain in the private blockchain database,
      (a-2) providing, by the server, the specific user with a first location information on where the specific using transaction is recorded in the private blockchain database, and
      (a-3) updating and registering, by the server, the specific value information including a specific balance of the specific electronic voucher data with a balance database;
   (b) determining, by the server, that one or more anchoring conditions are satisfied; then
      (b-1) calculating, by the server, a first representative hash value by calculating a root node hash value of a specific hash value and one or more neighboring hash values of the specific hash value, wherein the specific hash value is a hash value of (i) the specific electronic voucher data, (ii) the public key of the specific user, and (iii) the signature value of the specific user, and wherein the one or more neighboring hash values includes a hash value of a delta_n, wherein the delta_n includes all respective balances of all value information of all electronic vouchers that are identifiable by all respective location information on where all corresponding transactions are recorded in the n-th block of the blockchain in the private blockchain database,
      (b-2) registering, by the server, the first representative hash value with a public blockchain database, and
      (b-3) acquiring, by the server, a second location information on where the first representative hash value is recorded in the public blockchain database; and
   (c) in response to a verification request for the specific using transaction,
      (c1) calculating, by the server, a second representative hash value by calculating a new root node hash value using other hash value of the specific using transaction and said one or more neighboring hash values,
      (c2) acquiring, by the server, the first representative hash value from the public blockchain database using the second location information, and (c3) verifying, by the server, the specific using transaction by comparing the first representative hash value and the second representative hash value.

2. The method of claim 1, wherein, at the step of (b), the anchoring conditions include at least one of (i) a condition that one or more transactions related to the electronic voucher are created a certain number of times, (ii) a condition that a certain amount of time is elapsed, (iii) a condition that a block is created in the private blockchain database, and (iv) a condition that has at least one of characteristics of services.

3. The method of claim 1, wherein, the step of (a) further comprising;
(i) applying, by the server, a hashing function to the specific electronic voucher data to acquire a first value;
(ii) using, by the server, the public key of the specific user on the signature value of the specific user to acquire a second value; and
confirming, by the server, a validity of the specific electronic voucher data by comparing the first value with the second value.

4. The method of claim 1, wherein, the specific electronic voucher data further includes at least one of (i) information on a type of the specific electronic voucher, (ii) the public key of the specific user who is a sender of the specific electronic voucher, (iii) a public key of a specific seller who is a receiver of the specific electronic voucher, (iv) ID information of a specific issuer who issued the specific electronic voucher, and (v) information on an expiration date of the specific electronic voucher.

5. The method of claim 1, wherein, before the step of (a), further comprising:
acquiring, by the server, a request for registration of the specific user with the public key of the specific user; then (a01) transmitting, by the server, a random nonce to the specific user who is determined to be valid;
acquiring, by the server, a signature value of the random nonce that is obtained by signing a value of the random nonce with the private key of the specific user; then (a02)
(i) verifying, by the server, whether the signature value of the random nonce is rightfully signed by using the public key of the specific user,
(ii) storing, by the server, a registering transaction of the specific user, which includes the random nonce, the signature value of the random nonce, and the public key of the specific user, in the private blockchain database, and
(iii) providing, by the server, the specific user with a third location information on where the registering transaction is recorded in the private blockchain database; and
determining, by the server, that at least one or more anchoring conditions are satisfied; then (a03)
(i) calculating, by the server, a third representative hash value by using a certain hash value and its corresponding at least one neighboring hash value,
(ii) registering, by the server, the third representative hash value with the public blockchain database, and
(iii) acquiring, by the server, a fourth location information on where the third representative hash value is recorded in the public blockchain database, wherein the certain hash value is a hash value of (i) the random nonce, (ii) the signature value of the random nonce, and (iii) the public key of the specific user.

6. A server for using at least one specific electronic voucher by at least one specific user, comprising:
a communication interface configured to receive a specific electronic voucher data having at least one of a specific nonce and specific value information of the specific electronic voucher, a public key of the specific user, and a signature value of the specific user, wherein the signature value is acquired by signing a hash value of the specific electronic voucher data with a private key of the specific user; and
a processor configured to: (i) register the specific using transaction with a private blockchain database such that the specific using transaction is included in an n-th block of a blockchain in the private blockchain database, provide the specific user with a first location information on where the specific using transaction is recorded in the private blockchain database, and update and register the specific value information including a specific balance of the specific electronic voucher data with a balance database;
(ii) responsive to determining that one or more anchoring conditions are satisfied,
(ii-1) calculate a first representative hash value by calculating a root node hash value of a specific hash value and one or more neighboring hash values of the specific hash value, wherein the specific hash value is a hash value of the specific electronic voucher data, the public key of the specific user, and the signature value of the specific user, and wherein the one or more neighboring hash values includes a hash value of a delta_n, wherein the delta_n includes all respective balances of all value information of all electronic vouchers that are identifiable by all respective location information on where all corresponding transactions are recorded in the n-th block of the blockchain in the private blockchain database,
(ii-2) register the first representative hash value with a public blockchain database, and
(ii-3) acquire a second location information on where the first representative hash value is recorded in the public blockchain database; and
(iii) in response to a verification request for the specific using transaction,
(iii-1) calculate a second representative hash value by calculating a new root node hash value using other hash value of the specific using transaction and said one or more neighboring hash values,
(iii-2) acquiring the first representative hash value from the public blockchain database using the second location information, and
(iii-3) verifying the specific using transaction by comparing the first representative hash value and the second representative hash value.

7. The server of claim 6, wherein, the specific electronic voucher data further includes at least one of (i) information on a type of the specific electronic voucher, (ii) the public key of the specific user who is a sender of the specific electronic voucher, (iii) a public key of a specific seller who is a receiver of the specific electronic voucher, (iv) ID information of a specific issuer who issued the specific electronic voucher, and (v) information on an expiration date of the specific electronic voucher.

8. The server of claim 6, wherein, before the communication interface receives the specific electronic voucher data, the public key of the specific user, and the signature value of the specific user, the processor is further configured to:

acquire a request for registration of the specific user with the public key of the specific user; then (i) transmitting a random nonce to the specific user who is determined to be valid, and acquire a signature value of the random nonce that is obtained by signing a value of the random nonce with the private key of the specific user; then (ii)

(ii-1) verify whether the signature value of the random nonce is rightfully signed by using the public key of the specific user, (ii-2) store a registering transaction of the specific user, which includes the random nonce, the signature value of the random nonce, and the public key of the specific user, in the private blockchain database, and (ii-3) provide the specific user with a third location information on where the registering transaction is recorded in the private blockchain database, and determine that at least one or more anchoring conditions are satisfied; then (iii)

(iii-1) acquire a third representative hash value calculated by using a certain hash value and its corresponding at least one neighboring hash value, (iii-2) register the third representative hash value with the public blockchain database, and (iii-3) acquire a fourth location information on where the third representative hash value is recorded in the public blockchain database, wherein the certain hash value is a hash value of the random nonce, the signature value of the random nonce, and the public key of the specific user.

\* \* \* \* \*